(12) United States Patent
Newstadt et al.

(10) Patent No.: US 10,600,130 B1
(45) Date of Patent: Mar. 24, 2020

(54) CREATING DYNAMIC META-COMMUNITIES

(75) Inventors: Keith Newstadt, Newton, MA (US); Timothy G. Brown, Fort Edward, NY (US)

(73) Assignee: Symantec Corporation, Mountain View, CA (US)

( * ) Notice: Subject to any disclaimer, the term of this patent is extended or adjusted under 35 U.S.C. 154(b) by 1210 days.

(21) Appl. No.: 12/197,175

(22) Filed: Aug. 22, 2008

(51) Int. Cl.
*G06Q 50/00* (2012.01)
*H04L 12/58* (2006.01)

(52) U.S. Cl.
CPC ............. *G06Q 50/01* (2013.01); *H04L 51/36* (2013.01)

(58) Field of Classification Search
CPC .................................................... G06Q 50/01
See application file for complete search history.

(56) References Cited

U.S. PATENT DOCUMENTS

| 7,673,327 | B1 * | 3/2010 | Polis et al. ......................... 726/5 |
| 2004/0054740 | A1 * | 3/2004 | Daigle ................. G06Q 10/107 709/206 |
| 2006/0146991 | A1 * | 7/2006 | Thompson et al. ......... 379/67.1 |
| 2009/0037973 | A1 * | 2/2009 | Gustave et al. .................. 726/1 |
| 2009/0234876 | A1 * | 9/2009 | Schigel ............. G06F 17/30873 |
| 2010/0274815 | A1 * | 10/2010 | Vanasco ............ G06F 17/30867 707/798 |

FOREIGN PATENT DOCUMENTS

WO    WO2007/111426 A1 *  2/2007   ............... H04Q 7/20

OTHER PUBLICATIONS

Uldis Bojars, Alexandre Passant, John Breslin, Stefan Decker "Social Networks and Data Portability using Semantic Web technologies", 2nd Workshop on Social Aspects of the Web (SAW 2008), in conjunction with 11th International Conference on Business Information Systems (BIS 2008), 2008 pp. 1-19.*

* cited by examiner

*Primary Examiner* — Gabrielle A McCormick
*Assistant Examiner* — Maame Ofori-Awuah
(74) *Attorney, Agent, or Firm* — Patent Law Works LLP

(57) ABSTRACT

A user creates dynamic meta-communities that span membership of multiple existing third-party online communities, based on profile attributes. This allows the user to create targeted sub-communities for specific purposes without recreating or duplicating community information. The user can communicate with members of created meta-communities by leveraging the mechanisms provided by the third party online communities.

22 Claims, 2 Drawing Sheets

CREATING DYNAMIC META-COMMUNITIES

TECHNICAL FIELD

This invention pertains generally to online communities, and more specifically to creating dynamic meta-communities encompassing members of multiple, individual online communities.

BACKGROUND

Many Internet users participate in online communities. Online community members maintain profiles, in which they post information about themselves. Many users define multiple online communities via multiple sites, such as FaceBook, LinkedIn, MySpace, Plaxo, employee directories, IM buddy lists, etc. Different communities are defined for different purposes: interacting with close friends, business associates, long distance acquaintances, co-workers, etc. In order to participate in multiple communities, a user is expected to setup a profile on each site, which typically involves reentering the same personal information. Additionally, the user is expected to define a separate community specific to each service, which often involves overlap with other existing communities. Each time the user decides to participate in a new community based service, the user must again input profile data and define a community.

For example, a user might keep in contact with friends on FaceBook, MySpace, and Plaxo. To do so, the user would need to set up a separate profile and create a separate community on each of these sites. In order to use the career networking features on LinkedIn, the same user would need to create a new profile and community on that web site. Each of the user's friends on FaceBook, MySpace, and Plaxo would also need to join LinkedIn in order to be part of this career networking community.

As more and more community services are provided online, users will likely create many small targeted communities each including relevant people from across multiple communities for specific purposes: looking for a job, a new hire, a romantic relationship, a tenant, etc. Additionally, as more personal data is stored online, users will want to create specific, targeted communities that can or cannot view specific user data: the user's current geographic location, children's photos, financial data, medical data, etc. Manually entering a new profile and creating and maintaining a new community for each purpose would be very time-intensive and prone to error. It would also potentially require that a user gather given community members at yet another site before using a new service. It would be desirable to address these shortcomings.

SUMMARY

Users are enabled to define dynamic communities based on intended purpose, leveraging the existing communities they have already defined. A user can define a new, dynamic meta-community based on the profile attributes set in other online communities. Members of these existing communities need not register on yet another community web site to participate in the new service. A user defining a meta-community can optionally require validation for some or all of the profile information on which a new meta-community is based. A meta-community leverages the existing communication mechanisms provided by the third-party community sites. A Meta-community can be used in the same ways that any other community is used (to post messages, share data, etc.), but better targets the appropriate group of people, and does not have the overhead associated with defining a new community from scratch.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
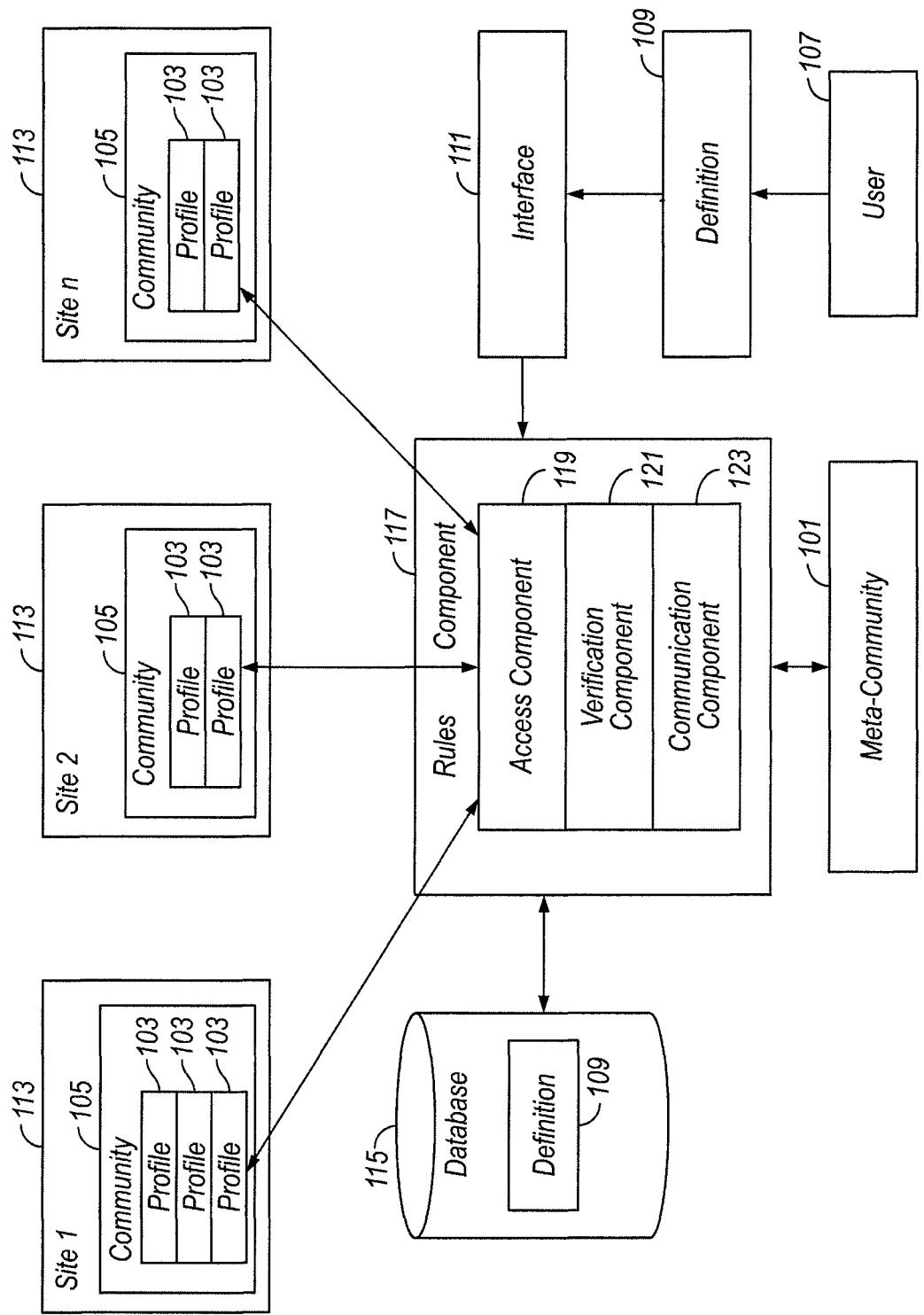
FIG. 1 is a block diagram illustrating creating dynamic meta-communities based on attributes of multiple, existing online communities, according to some embodiments of the present invention.

FIG. 1 illustrates a system for creating dynamic meta-communities 101 based on encompassing members of multiple, existing online communities 105, according to some embodiments of the present invention. It is to be understood that although various components are illustrated and described above as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, to define a meta-community 101, a user 107 specifies the membership criteria 109. For example, a user 107 could request a meta-community 101 that include everyone the user 107 knows who works at a specific company, and lives in the greater Los Angeles area. This meta-community 101 would include all members of the user's existing communities 105 on various community sites 113 (e.g., LinkedIn, FaceBook, Plaxo, etc.) whose profiles 103 list the given company as their current employer, and a home address within the target geographical area. As new members with these criteria 109 are added to the user's online communities 105, or existing members update their profiles 103 so as to meet these definitions 109, such members are included in the meta-community 101. Likewise, if members no longer cease to meet the criteria 109 based on their profiles 103, the dynamic meta-community 101 is updated accordingly. The profiles 103 of the existing communities 105 are simply referenced rather than copied, so that the dynamic meta-community 101 is always up-todate. Meta-communities 101 can be defined with any degree of specificity, from something as broad as "all of my friends" to something as specific as "business associates who are in Chicago O'Hare Airport right now."

Users 107 can enter meta-community definitions 109 through any type of interface 111, such as a graphical user interface, command line, etc. Such an interface 111 allows the user 107 to define meta-communities 101 based on attributes defined in third-party online communities 105. These definitions 109 are stored in a database 115 (or other suitable storage mechanism), which is accessible to other components described below as appropriate.

A meta-community rules component 117 accesses meta-community definitions 109 and determines whether members of the user's various communities 105 defined on third-party community web sites 113 should be included in a given, meta-community 101. In order to assemble a dynamic meta-community 101, the rules component 117 examines the profiles 103 of these members to determine whether their relevant attributes match the specified criteria 109. In order to glean the profile 103 attributes to examine, an attribute access component 119 (illustrated in FIG. 1 as a sub-component of the rules component 117) accesses the various community-based online sites 113 of which the user 107 defining the meta-community 101 is a member. The attribute access component 119 collects the relevant attributes from each site 113 for examination by the rules component 117. This attribute gleaning/compliance examination process can be performed not only when a meta-community 101 is created, but periodically and/or responsive to specified profile/community activity as desired.

The access component 119 typically comprises a set of plug-ins (not illustrated), each of which is responsible for implementing data source specific functionality for a given site 113, such as login, screen scraping, email/IM database access, etc. This site 113 specific functionality can be mapped to a simple known interface/API, thus normalizing access component 119 actions across multiple sites 113. In other words, each plug-in is specifically configured to collect relevant profile 103 information in the native format of its target site 113 by using site 113 specific appropriate protocols. The plug-ins transparently provide this information for examination purposes. This component thus provides an abstraction through which the rules component 117 can receive data from any number of third party web sites 113. In one embodiment, the functionality of these plug-ins is built directly into the access component 119, although the plug-in model provides a more flexible and extensible framework.

Note that users 107 define meta-communities 101 based on profile 103 attributes of members of existing communities 105. If these attributes are not correct, either because of error or misrepresentation, then the inaccuracies will exist in the corresponding meta-community 101. Depending on the nature of the meta-community 101, this may or may not be important to the user 107. For example, if a user 107 defines a meta-community 101 to share pictures of his last vacation, he might not care whether someone has managed to become part of the community 101 under false pretenses. However, if a user 107 defines a meta-community 101 that shares his current geographic location or financial data, he likely will not be tolerant of such fraud. Therefore, the user 107 can optionally specify in a meta-community definition 109 that some or all specified profile 103 attributes are to be verified (i.e., a meta-community 101 can be configured to consider only verified profile 103 attributes).

Where the meta-community definition 109 specifies profile 103 attribute verification, a verification component 121 (illustrated in FIG. 1 as a sub-component of the rules component 117) can use any of a variety of data verification methodologies to verify the identities of the profile owners 107 and/or the personal information included in online profiles 103. Any existing method of verification can be leveraged. For example, the verification component 121 can use the methodology described in co-filed patent application Newstadt et. al, titled "Verification and Validation of Externally Maintained Profile Attributes," U.S. patent application Ser. No. 12/195,375, having the same assignee, the entirety of which is hereby incorporated by reference.

A communication component 122 allows the user 107 to communicate and share information with members of a created meta-community 101. The communication component 122 leverages the communication mechanisms provided by the underlying third-party community-based sites 113. Typically, the communication component 122 comprises a plurality of site specific plug-ins (not illustrated), each of which is responsible for implementing communication functionality for a given site 113. This is similar to the plug-in based operation of the access component 119, described above. For example, a meta-community 101 might contain members of FaceBook, an employee directory, and an IM buddy list. If the user 107 chose to share a photo with this meta-community 101, the photo could be posted on the walls of the FaceBook members, attached to emails sent to members of the employee directory, and pointed to by a share location link sent in an IM to members of the buddy list. This simply represents examples of the types of communication mechanisms available in some underlying third party based community sites 113, and is by no means exhaustive.

Figure 2:
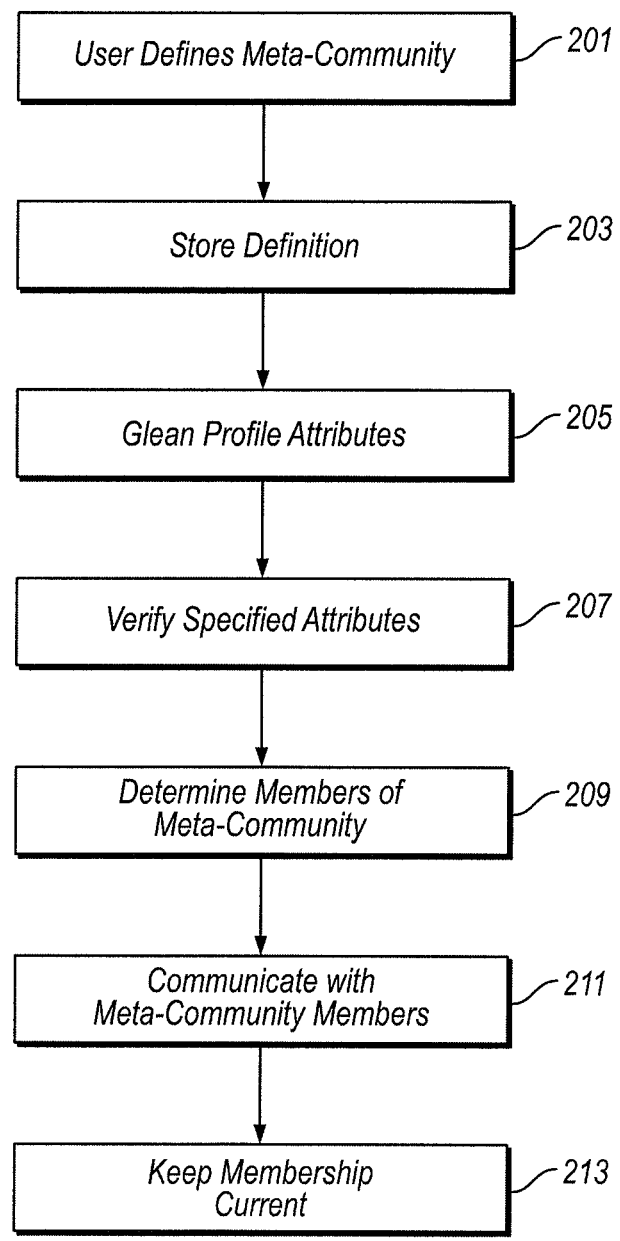
FIG. 2 is a block diagram illustrating steps for creating a dynamic meta-community, according to some embodiments of the present invention.

FIG. 2 illustrates steps for creating a dynamic meta-community, according to some embodiments of the present invention. A user 107 defines 201 criteria 109 for a new meta-community 101 by operating a user interface 111. The meta-community definition 109 is stored 203 in the database 109. The access component 119 gleans 205 relevant attributes from the profiles 103 of the members of the user's existing communities 105 on a plurality of third-party sites 113. The verification component 121 verifies 207 specified attributes as per the meta-community definition 109. Based on the profile attributes, the rules component 117 determines 209 which members of the user's existing communities 105 meet the criteria 109 for the meta-community 101. (This step defines the members of the meta-community 101.) The user subsequently communicates 211 between members of the meta-community 101 by using the communication component 123. The rules component 117 and the access component 119 keep 213 the membership of the meta-community 101 current, as profile owners 107 change their attributes over time.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any computing device. Accordingly, the disclosure of the present invention is intended to be illustrative, but not limiting, of the scope of the invention, which is set forth in the following claims.

What is claimed is:

1. A machine implemented method for creating a dynamic meta-community comprising members of each of at least two online communities from different service providers, the method comprising the steps of:
    receiving from a user interface for a meta-community, by a computer, a user's specification of membership criteria for the meta-community based on particular attributes of each of a plurality of online communities from different service providers;
    accessing, by a computer, profiles of members of each of the plurality of different social networking web sites of which the user is a member using a set of plug-ins, wherein each plug-in implements data source specific functionality for accessing the profiles of members of each of the plurality of online communities from different service providers;
    determining, by a computer, which members of each of the plurality of online communities from different service providers meet the membership criteria for the meta-community, based on the particular attributes of each of the plurality of online communities and the accessed profiles;
    defining, by a computer, an unregistered membership in the meta-community for those members of each of the plurality of online communities from different service providers who meet the membership criteria;
    sharing, by a computer, a single communication including content from the user to the meta-community; and
    posting, by a computer, the content to the at least two online communities from different service providers with the single communication from the user using the set of plug-ins, wherein each plug-in implements data source specific functionality for posting the content to each of the at least two online communities and each service provider uses a predetermined type of content posting to the members.

2. The method of claim 1, further comprising:
    storing the received specification of membership criteria for the meta-community.

3. The method of claim 1, wherein accessing profiles of members of each of the plurality of existing online communities of which the user is a member further comprises:
    collecting data concerning at least one profile attribute concerning at least one profile owner of each of the plurality of existing online communities from at least one associated underlying site.

4. The method of claim 1, further comprising:
    responsive to the specification of membership criteria for the meta-community, verifying at least some collected profile attribute data.

5. The method of claim 1, further comprising:
    communicating with at least some members of the meta-community by utilizing communication protocols of underlying sites hosting existing online communities, members of which are among the unregistered membership of the meta-community.

6. The method of claim 5, wherein communicating with at least some members of the meta-community further comprises utilizing at least one communication mechanism from a group of communication mechanisms consisting of:
    email;
    instant messaging;
    shared links; and
    data posting.

7. The method of claim 1, further comprising:
    updating the unregistered membership of the meta-community based on at least one change to at least one profile of at least one member of an existing online community.

8. The method of claim 1, wherein the different service providers each use distinct types of sharing.

9. The method of claim 8, wherein the different types of sharing comprise at least two of: an e-mail, an instant message, and a post.

10. At least one non-transitory computer readable medium storing a computer program product for, when executed, causing a processor to perform a method for creating a dynamic meta-community comprising members of each of at least two online communities from different service providers, the computer program product comprising program code for:
    receiving from a user interface for a meta-community, by a computer, a user's specification of membership criteria for the meta-community based on particular attributes of each of a plurality of online communities from different service providers;
    accessing, by a computer, profiles of members of each of the plurality of different social networking web sites of which the user is a member using a set of plug-ins, wherein each plug-in implements data source specific functionality for accessing the profiles of members of each of the plurality of online communities from different service providers;
    determining, by a computer, which members of each of the plurality of online communities from different service providers meet the membership criteria for the meta-community, based on the particular attributes of each of the plurality of communities and the accessed profiles;
    defining, by a computer, an unregistered membership in the meta-community for those members of each of the plurality of online communities from different service providers who meet the membership criteria;
    sharing, by a computer, a single communication including content from the user to the meta-community; and
    posting, by a computer, the content to the at least two online communities from different service providers with the single communication from the user using the set of plug-ins, wherein each plug-in implements data source specific functionality for posting the content to each of the at least two online communities and each service provider uses a predetermined type of content posting to the members.

11. The computer program product of claim 10, further comprising:
   program code for storing the received specification of membership criteria for the meta-community.

12. The computer program product of claim 10, wherein the program code for accessing profiles of members of each of the plurality of existing online communities of which the user is a member further comprises:
   program code for collecting data concerning at least one profile attribute concerning at least one profile owner of each of the plurality of existing online communities from at least one associated underlying site.

13. The computer program product of claim 10, further comprising:
   program code for, responsive to the specification of membership criteria for the meta-community, verifying at least some collected profile attribute data.

14. The computer program product of claim 10, further comprising:
   program code for communicating with at least some members of the meta-community by utilizing communication protocols of underlying sites hosting existing online communities, members of which are among the unregistered membership of the meta-community.

15. The computer program product of claim 14, wherein the program code for communicating with at least some members of the meta-community further comprises program code for utilizing at least one communication mechanism from a group of communication mechanisms consisting of:
   email;
   instant messaging;
   shared links; and
   data posting.

16. The computer program product of claim 10, further comprising:
   program code for updating the unregistered membership of the meta-community based on at least one change to at least one profile of at least one member of an existing online community.

17. A computer system for creating a dynamic meta-community comprising members of each of at least two online communities from different service providers, the computer system comprising:
   a communication component, coupled to a processor, to receive from a user interface for a meta-community a user's specification of membership criteria for the meta-community based on particular attributes of each of a plurality of online communities from different service providers;
   an access component to access profiles of members of each of the plurality of online communities from different service providers of which the user is a member using a set of plug-ins, wherein each plug-in implements data source specific functionality for accessing the profiles of members of each of the plurality of online communities from different service providers; and
   a rules component to determine which members of each of the online communities from different service providers meet the membership criteria for the meta-community, based on the particular attributes of each of the plurality of communities and the accessed profiles and define an unregistered membership in the meta-community for those members of each of the plurality of online communities from different service providers who meet the membership criteria,
   wherein the communication component is further operative to share a single communication including content from the user to the meta-community and post the content to the at least two online communities from different service providers with the single communication from the user using the set of plug-ins, wherein each plug-in implements data source specific functionality for posting the content to each of the at least two online communities and each service provider uses a predetermined type of content posting to the members.

18. The computer system of claim 17, wherein the accessing component collects data concerning at least one profile attribute concerning at least one profile owner of each of the plurality of existing online communities from at least one associated underlying site.

19. The computer system of claim 17, further comprising:
   a verification component to, responsive to the specification of membership criteria for the meta-community, verify at least some collected profile attribute data.

20. The computer system of claim 17, wherein the communication component communicates with at least some members of the meta-community by utilizing communication protocols of underlying sites hosting existing online communities, members of which are among the unregistered membership of the meta-community.

21. The computer system of claim 20, wherein the communication component utilizes at least one communication mechanism from a group of communication mechanisms consisting of:
   email;
   instant messaging;
   shared links; and
   data posting.

22. The computer system of claim 17, wherein the access component:
   updates the unregistered membership of the meta-community based on at least one change to at least one profile of at least one member of an existing online community.

* * * * *